United States Patent
DeJonge (10) Patent No.: US 9,589,318 B2
(45) Date of Patent: Mar. 7, 2017

(54) METHOD AND SYSTEM FOR GENERATING AIRPORT SURFACE MAP GRAPHICS IN AIRCRAFT COCKPIT DISPLAYS

(71) Applicant: GE Aviation Systems LLC, Grand Rapids, MI (US)

(72) Inventor: Michael Kent DeJonge, Caledonia, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 193 days.

(21) Appl. No.: 14/467,090

(22) Filed: Aug. 25, 2014

(65) Prior Publication Data

US 2016/0055670 A1    Feb. 25, 2016

(51) Int. Cl.
| | |
|---|---|
| G06T 11/20 | (2006.01) |
| G06T 17/20 | (2006.01) |
| G06T 17/30 | (2006.01) |
| G06T 3/40 | (2006.01) |
| G06T 11/40 | (2006.01) |

(52) U.S. Cl.
CPC .............. G06T 3/40 (2013.01); G06T 11/203 (2013.01); G06T 11/40 (2013.01)

(58) Field of Classification Search
None
See application file for complete search history.

(56) References Cited

U.S. PATENT DOCUMENTS

| | | | |
|---|---|---|---|
| 5,590,248 A | 12/1996 | Zarge et al. | |
| 6,262,737 B1 | 7/2001 | Li et al. | |
| 2002/0018066 A1* | 2/2002 | Vizer | G06T 17/20 345/428 |
| 2009/0265089 A1* | 10/2009 | Gauffriau | G01C 21/00 701/120 |

(Continued)

FOREIGN PATENT DOCUMENTS

| | | |
|---|---|---|
| EP | 0707289 A1 | 4/1996 |
| EP | 1241623 A2 | 9/2002 |

(Continued)

OTHER PUBLICATIONS

Suzanne M. Shontz and Dragos M. Nistor, "CPU-GPU Algorithms for Triangular Surface Mesh Simplification", Proceedings of the 21st International Meshing Roundtable, pp. 475-492, copy right 2013, http://link.springer.com/chapter/10.1007%2F978-3-642-33573-0_28?LI.*

(Continued)

Primary Examiner — Tize Ma
(74) Attorney, Agent, or Firm — GE Global Patent Operation; William S. Munnerlyn (57) ABSTRACT

A method of reducing the size of data representing an image in a graphical display wherein the data comprises triangle strings representing polygons that form the image, includes steps to determine a size of a pixel in the image; compare the size of a pixel in the image to a narrowest dimension of a polygon that encompasses the pixel and determine a number of triangles in a triangle string that represents the polygon. If the narrowest dimension of the polygon is larger than the image size, reducing the number of triangles in the triangle string using triangle decimation and if the polygon is similar to the image size, leaving the number of triangles in the triangle string unchanged.

20 Claims, 6 Drawing Sheets

(56) References Cited

U.S. PATENT DOCUMENTS

| | | | |
|---|---|---|---|
| 2010/0277476 A1* | 11/2010 | Johansson | G06T 17/205 345/423 |
| 2012/0206469 A1* | 8/2012 | Hulubei | G09B 29/006 345/581 |

FOREIGN PATENT DOCUMENTS

| | | |
|---|---|---|
| EP | 1241625 A2 | 9/2002 |
| EP | 1241626 A2 | 9/2002 |
| EP | 1964869 A1 | 9/2008 |
| WO | 0045237 A2 | 8/2000 |
| WO | 2007069223 A2 | 6/2007 |

OTHER PUBLICATIONS

Schroeder et al., "Decimation of Triangle Meshes", General Electric Company, Jul. 1992, pp. 65-70, vol. No. 26, Computer Graphics, Schenectady NY.

Hoppe, "Progressive Meshes", Microsoft Research, 1996, pp. 99-108, vol. No. 30, Computer Graphics, SIGGRAPH '96 Proceedings.

Luebke, "A Survey of Polygonal Simplification Algorithms", University of North Carolina at Chapel Hill, 1997, pp. 1-8, UNC Technical Report TR97-045.

Schroeder, "A Topology Modifying Progressive Decimation Algorithm", GE Corporate R&D Center, 1997, pp. 173-182, vol. No. 97, Proc. of IEEE Visualization.

Hoppe, "View-Dependent Refinement of Progressive Meshes", Microsoft Research, 1997, pp. 1-10.

Luebke, "View-Dependent Simplification of Arbitrary Polygonal Environments", University of North Carolina at Chapel Hill, 1997, pp. 1-11, vol. No. 31, Computer Graphics SIGGRAPH 97.

Melax, "A Simple, Fast, Effective Polygon Reduction Algorithm", Nov. 1998, pp. 1-8, Game Developer.

Cohen, "Appearance-Preserving Simplification of Polygonal Models", University of North Carolina at Chapel Hill, 1999, pp. 1-130.

Luebke, "A Developer's Survey of Polygonal Simplification Algorithms", University of Virginia, 0272-1716, May-Jun. 2001, pp. 24-35.

GB Search Report issued in connection with corresponding GB Application No. 1514753.1 on Jan. 20, 2016.

* cited by examiner

METHOD AND SYSTEM FOR GENERATING AIRPORT SURFACE MAP GRAPHICS IN AIRCRAFT COCKPIT DISPLAYS

BACKGROUND OF THE INVENTION

The data interchange format for a graphical representation of an airport on a cockpit display is specified in ARINC characteristic 816, an aviation standard that defines a database for airport moving maps. ARINC 816 defines an open encoding format for describing airport features that may be loaded in aircraft systems. Many features have a specified interchange format that consists of a series of triangle strings (i.e. an ordered list of triangles that share vertices) to compose polygons. A number of polygons collectively describes and approximates a geographic feature. The number of triangles for the accurate depiction of a feature depends upon the accuracy requirements for the map display. Typically, 1 to 2 meter resolution is required to support the lowest available range scale. For large airports covering nearly 5 nautical miles (nmi), the number of triangles required for all the airport features may be over 100,000 triangles.

Triangle decimation is a process for reducing the number of triangles needed to represent a polygon representative of a feature on a graphical display and is commonly used in gaming and medical industries such as for magnetic resonance imaging (MRI) and ultrasound displays. When the size of a polygon is close to the smallest visible element on the display (i.e. a pixel), a graphical system may render a fewer number of triangles to depict the polygonal feature.

BRIEF DESCRIPTION OF THE INVENTION

One aspect of the invention relates to a method of reducing the size of data representing an image in a graphical display wherein the data comprises triangle strings representing polygons that form the image. The method comprises to determining a size of a pixel in the image; comparing the size of a pixel in the image to a narrowest dimension of a polygon that encompasses the pixel and determining a number of triangles in a triangle string that represents the polygon.

DESCRIPTION OF EMBODIMENTS OF THE INVENTION

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and devices are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Figure 1:
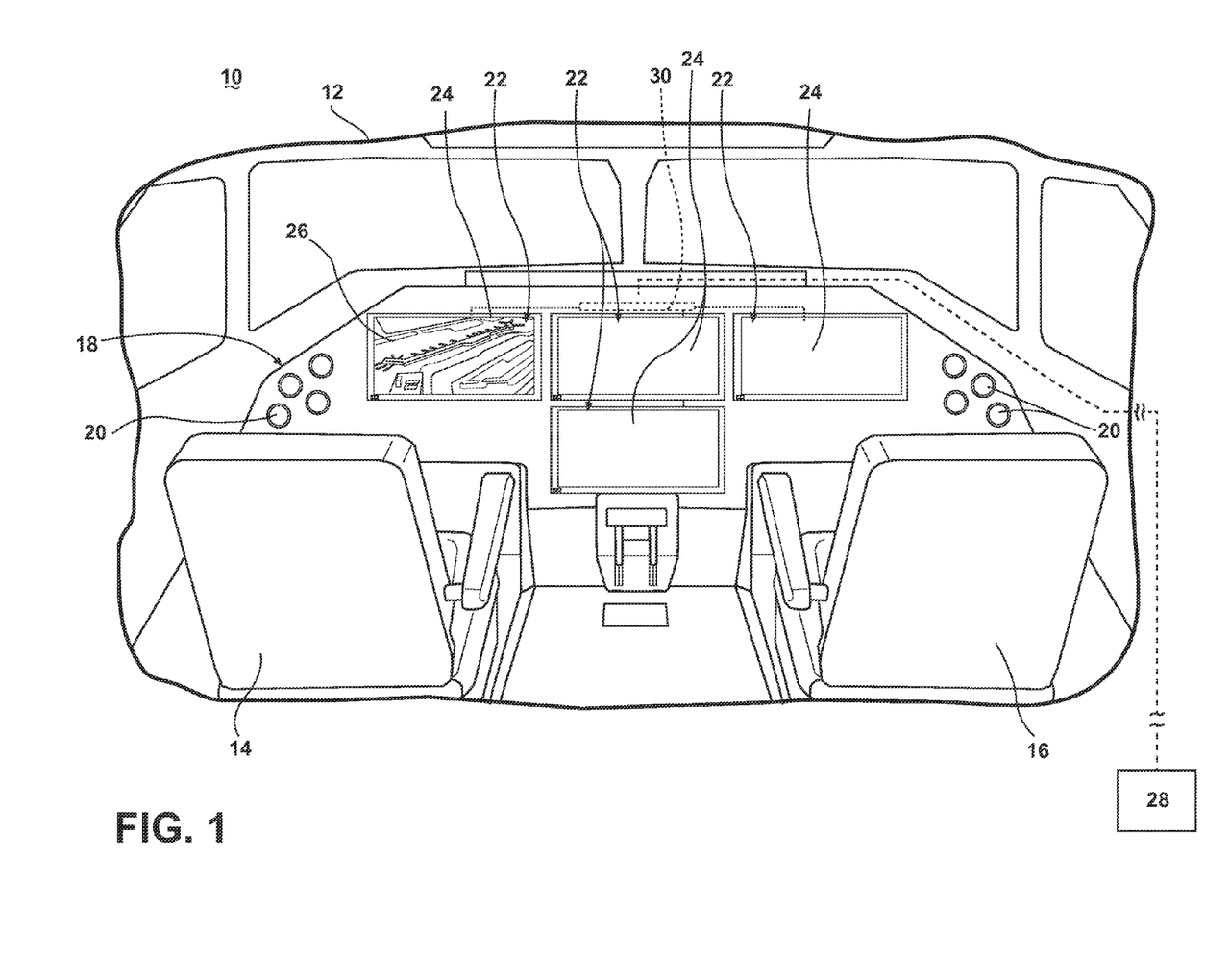
FIG. 1 is a perspective view of a portion of an aircraft cockpit with a display module for showing an airport surface map.

Technical effects of the method disclosed in the embodiments include defining a geographic feature for displaying on a cockpit navigation display where the feature data is preserved and no new points are created by interpolation or other manipulation. Airworthy regulations require that data used to depict an airport on a cockpit display not be altered from the original capture process. Another technical advantage is that the triangle decimation procedure can be processed rapidly, in part, because it does not require any trigonometric or square root computations. FIG. 1 illustrates a portion of an aircraft 10 having a cockpit 12. While a commercial aircraft has been illustrated, it is contemplated that embodiments of the invention may be used in any type of aircraft, for example, without limitation, fixed-wing, rotating-wing, rocket, personal aircraft, and military aircraft, or for that matter, any application where the size of the data for generating graphical display is an issue. In this embodiment, a first user (e.g., a pilot) may be present in a seat 14 at the left side of the cockpit 12 and another user (e.g., a co-pilot) may be present at the right side of the cockpit 12 in a seat 16. A flight deck 18 having various instruments 20 and multiple flight display modules 22 may be located in front of the pilot and co-pilot and may provide the flight crew with information to aid in flying the aircraft 10.

The flight display modules 22 may include either primary flight displays or multi-function displays and may display a wide range of aircraft, flight, navigation, systems, and other information used in the operation and control of the aircraft 10. The flight display modules 22 have been illustrated as being in a spaced, side-by-side arrangement with each other. The flight display modules 22 may be laid out in any manner including having fewer or more displays. Further, the flight display modules 22 need not be coplanar and need not be the same size. A display panel 24 on which the display representation may be provided may be included in the flight display modules 22. This display panel may include any display panel having a matrix of individually controllable pixels, such as LCD and LED. By way of non-limiting example the display panel 24 may be a flat Active Matrix Liquid Crystal Display (AMLCD) panel.

A cockpit display unit 30 may be operably coupled to components of the aircraft 10 including the flight display modules 22. The cockpit display unit 30 may also be connected with other controllers (not shown) of the aircraft 10 and may include memory and processing units, which may be running any suitable programs to display information to the aircraft's pilots. The cockpit display unit 30 may include one or more graphic processors dedicated to rendering high resolution displays. The cockpit display unit 30 may also receive inputs from one or more other additional sensors (not shown), which may provide the cockpit display unit 30 with various information to aid in the operation of the aircraft 10.

Modern aircraft use a time-shared Ethernet data channel between a central processing unit 28 and the cockpit display unit 30. The central processing unit 28 is a multi-processor cabinet with general purpose processors that host a number of application programs, one of which may be an airport surface map system application. The Ethernet data channel is partitioned into fixed timing ports where each of the application programs is assigned a specific time slot for its data transmission. The bandwidth for the data bus affects the response time for the crew to see the airport map. In the case of a large airport to be displayed on a 10 nmi scale, over 100,000 triangles may be required to be transmitted to the display module 22. Without culling the data, 100,000 triangles may translate to nearly 2 Megabytes (MB) of data which would require the entire Ethernet data bus capacity for a one-second response time.

As depicted in FIG. 1, at least one of the display modules 22 may be configured as a navigation display (ND) and may display data illustrating geographic features such as an airport surface map 26. To provide for smooth display viewing, the display module 22 shifts the triangulated data laterally and rotationally approximately 10 times per second as the aircraft moves. Modern processors may handle approximately 10,000 to 20,000 triangles at this rate, far below the 100,000 triangles that may be required for displaying all the features for a representative airport.

To summarize, the data transmission channel between the central processing unit 28 for the airport surface map application and the cockpit display unit is bandwidth limited and the number of triangles which a display module can handle (e.g. process and render in a timely fashion) is limited. Consequently, the central processing unit 28 may reduce the size of the feature data to be transmitted to the cockpit display unit to conform to the bandwidth requirements of the intervening data bus and the processing limits of the display module.

According to embodiments of the present invention, as described below, a processor such as the central processing unit 28 may limit the feature data by comparing the size of a pixel to a dimension of a polygonal feature that encompasses the pixel. Note that the size of the pixel as referred to herein refers to the dimension represented by a pixel of a display panel for a given image displayed thereon. For example, consider a setting for the display where a high range scale is selected such as 10 nmi. For a typical display set with an extent of approximately 10 nmi, a pixel will represent a spatial extent of approximately 24 m (meters). That is, the pixel size of the image is 24 m. Individual triangles of a polygonal feature with a dimension that is less than the pixel size cannot be distinguished from one another and therefore a number of such triangles may be merged into one or two larger triangles using a triangle decimation process. Generally, a method for reducing the size of the data according to embodiment of the invention, determines two states for each triangle string; either decimate the triangle string to 3 or 4 points representing the vertices of one or two triangles or leave the triangle string unchanged. The state depends upon the relative size of the polygonal feature as compared to the pixel size.

Figure 2:
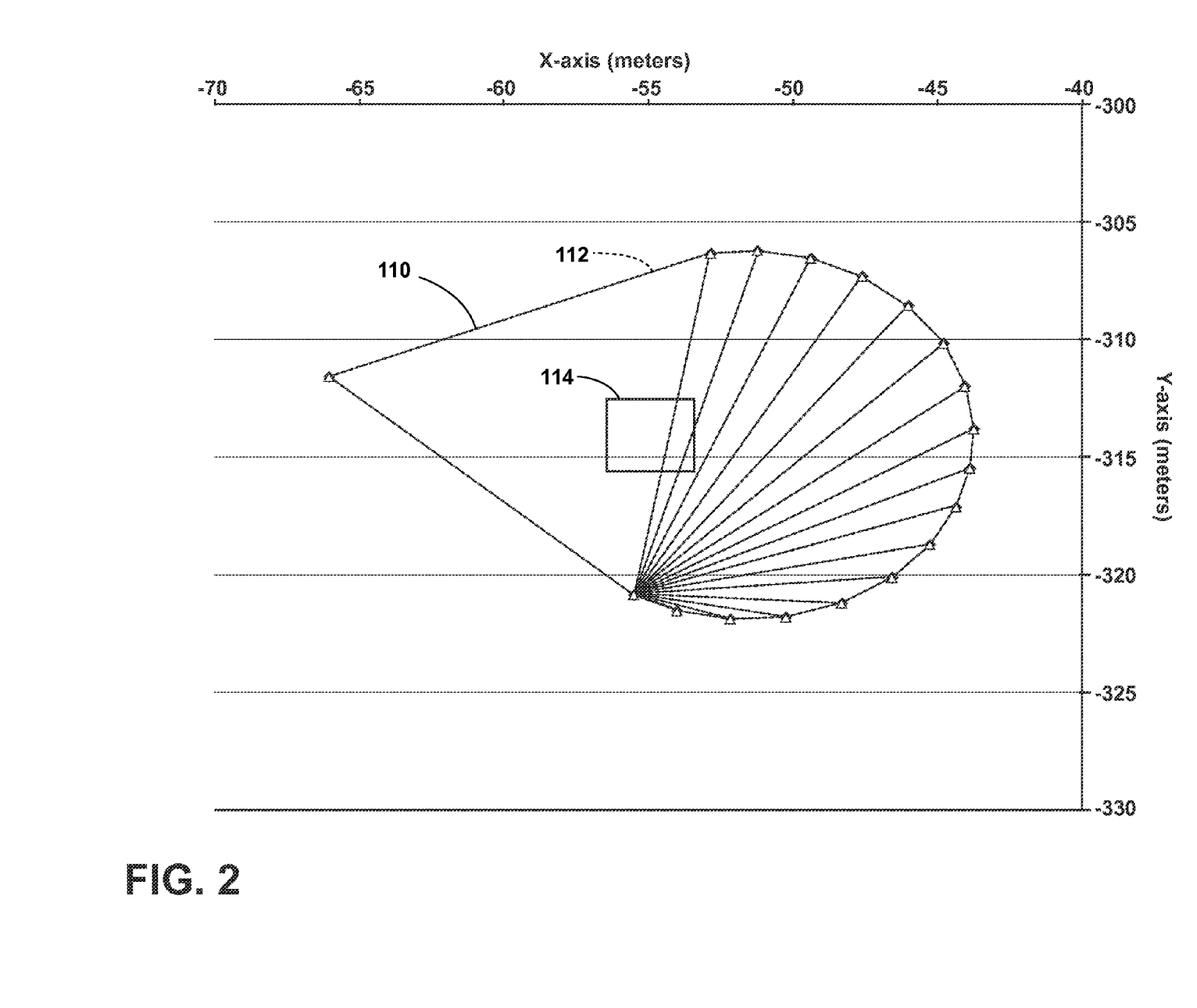
FIG. 2 shows a non-decimated polygonal feature constructed from multiple triangles.

Referring now to FIG. 2, a non-decimated polygonal feature 112 constructed from multiple triangles is shown. The figure depicts what a portion of a display of an airport surface map may show. The x-axis and y-axis are shown in image coordinates with units of meters and each pixel such as pixel 114 has a pixel size in image coordinates of about 3 m. A 3 m pixel size typical a display set with a 1 nmi range scale.

Consider a polygonal feature 110 where the triangle string for the feature includes the vertices for 17 triangles. The central processing unit determines that the displayed polygonal feature 112 is formed from the entire triangle string. That is, the displayed polygonal feature 112 is unchanged from the source data depicting the stored polygonal feature 110. The central processing unit determines that the displayed polygonal feature 112 is unchanged from the stored polygonal feature by comparing the size of a display pixel 114 (e.g. 3 meters) to polygon's narrowest dimension on either the x-axis or the y-axis (e.g. just over 15 meters along the y-axis).

Figure 3:
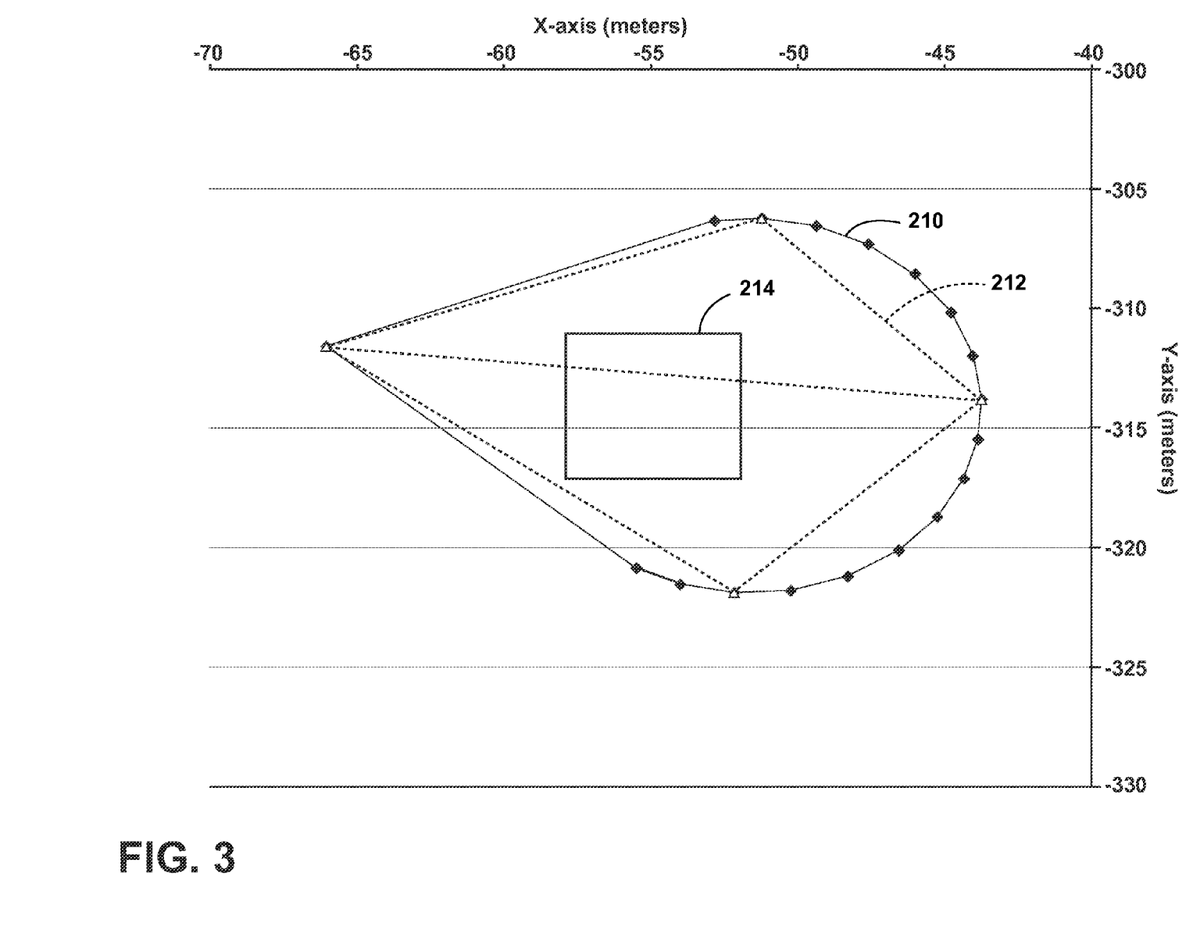
FIG. 3 shows a decimated polygonal feature constructed from two triangles.

Referring now to FIG. 3, a decimated polygonal feature 212 constructed from two triangles is shown. The number of triangles to represent the same stored polygonal feature 210 as described in FIG. 2 may be reduced at larger scales. With the display set at a wider range scale of approximately 2 nmi, each pixel 214 has a pixel size in the image coordinates of about 6 meters. The same stored polygonal feature 210 is shown, but the displayed polygonal feature 212 includes only two triangles. That is, the central processing unit, based on a comparison of the pixel size and the dimensions of the stored polygonal feature determines that the triangle string for the displayed feature 212 may collapse to the vertices of two of the triangles in the original stored feature 210. At range scales above 2 nmi, the decimated representation is unchanged.

To determine if the triangle string representing a polygonal feature is to be decimated, the central processing unit may compare the pixel size in the image to a value indicative of the dimension of the polygonal feature. To determine the pixel size (Ps), the central processing unit may, for example, divide the range scale by the number of pixels in a row or column of the display panel. The central processing unit may directly perform the calculation or access a lookup table or perform on of any combinations of calculation and data access commonly used in computing applications to determine the pixel size as a function of the display panel's configuration and range scale.

To determine the dimension of the polygonal feature, the central processing unit may determine relevant extrema of the vertices of the triangle list. Recall that the triangle list describes the polygonal feature includes the x and y coordinates of the vertex and is ordered so the list includes an identifying number for the triangle to which the vertex applies. The central processing unit may determine the minimum value on the x-axis (Xmin) of the vertices of the triangle list along with the point number (Pxmin) corresponding to the vertex containing Xmin. Similarly, the central processing unit may determine the maximum value on the x-axis (Xmax) of the vertices of the triangle list, the point number (Pxmax) corresponding to the vertex containing Xmax, the minimum value on the y-axis (Ymin) of the vertices of the triangle list, the point number (Pxmin) corresponding to the vertex containing Ymin, the maximum value on the y-axis (Ymax) of the vertices of the triangle list, the point number (Pymax) corresponding to the vertex containing Ymax. In the case where multiple vertices in the triangle list have an x coordinate at Xmin, Pxmin will be set to the point number of the vertex with the lowest y coordinate of the multiple vertices. Similarly, in the case where multiple vertices in the triangle list have an x coordinate at Xmax, Pxmax will be set to the point number of the vertex with the highest y coordinate of the multiple vertices. In the case where multiple vertices in the triangle list have a y coordinate at Ymin, Pymin will be set to the point number of the vertex with the lowest x coordinate of the multiple vertices. Similarly, in the case where multiple vertices in the triangle list have a y coordinate at Ymax, Pymax will be set to the point number of the vertex with the highest x-coordinate of the multiple vertices.

The central processing unit may determine a set of vertices based on the extrema of the vertices as described above. That is, the central processing unit may determine the x and y coordinates of the vertex that corresponds to Pxmin, Pxmax, Pymin and Pymax. The x coordinate, $Pxmin_x$, is the x coordinate of the vertex referenced by the point numbered Pxmin. Similarly, the y coordinate, $Pxmin_y$, is the y coordinate of the vertex referenced by the point numbered Pxmin. The x coordinate, $Pxmax_x$, is the x coordinate of the vertex referenced by the point numbered Pxmax. Similarly, the y coordinate, $Pxmax_y$ is the y coordinate of the vertex referenced by the point numbered Pxmax. The x coordinate, $Pymin_x$, is the x coordinate of the vertex referenced by the point numbered Pymin. Similarly, the y coordinate, $Pymin_y$, is the y coordinate of the vertex referenced by the point numbered Pymin. The x coordinate, $Pymax_x$, is the x coordinate of the vertex referenced by the point numbered Pymax. Similarly, the y coordinate, $Pymax_y$ is the y coordinate of the vertex referenced by the point numbered Pymax.

Figure 4:
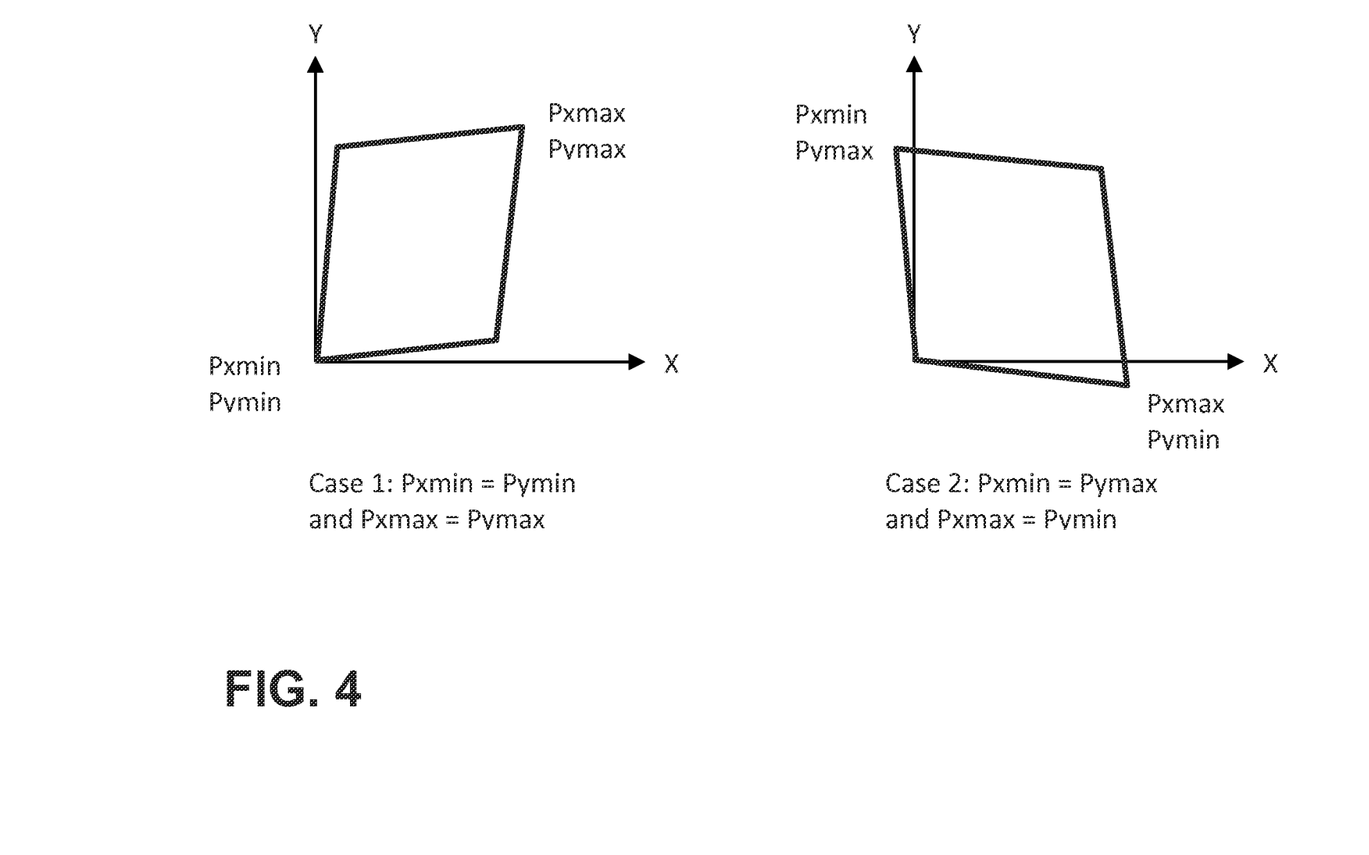
FIG. 4 shows polygonal features where more than one vertex of the polygon includes an extreme for both the x and y coordinates.

In summary, by way of sorting the triangle list and selecting vertices with minimum or maximum coordinates, the central processing unit, constructs the following coordinate list that defines a quadrilateral:

$(Pymin, Pymin_x, Pymin_y)$, $(Pxmin, Pxmin_x, Pxmin_y)$, $(Pxmax, Pxmax_x, Pxmax_y)$, $(Pymax, Pymax_x, Pymax_y)$ In cases where the quadrilateral is elongated and oriented on an angle with respect to the coordinate axes where Pxmin=Pymin or Pxmax=Pymax or Pxmin=Pymax or Pxmax=Pymin, the quadrilateral collapses and degenerates to a triangle or a straight line which may compromise the decimation selection logic. Referring now to FIG. 4, two exemplary polygonal features where more than one vertex of the polygon includes an extrema for both the x and y coordinates are shown. To avoid the cases where the quadrilateral degenerates into a triangle or line, the central processing unit repeats the determination of the vertices of a quadrilateral by searching for the vertices at the extrema with respect to a 45-degree rotation of the coordinate axes. The central processing unit finds the points by substituting (x+y) for x and (x−y) for y. The central processing unit then determines point A as the point in the triangle list where the x+y is at a minimum. If more than one point meets this criterion, then the processor selects the point with the lowest x coordinate. The central processing unit then determines point B as the point in the triangle list where the x+y is at a maximum. If more than one point meets this criterion, then the processor selects the point with the highest x coordinate. The central processing unit then determines point C as the point in the triangle list where the x−y is at a minimum. If more than one point meets this criterion, then the processor selects the point with the highest y coordinate. The central processing unit then determines point D as the point in the triangle list where the x−y is at a maximum. If more than one point meets this criterion, then the processor selects the point with the lowest y coordinate.

In summary, by way of sorting the rotated triangle list and selecting vertices with minimum or maximum coordinates, the central processing unit, constructs the following coordinate list that defines a second quadrilateral:

$$A = (P(+y)\min, P(x+y)\min_x, P(x+y)\min_y),$$

$$B = (P(+y)\max, P(x+y)\max_x, P(x+y)\max_y),$$

$$C = (P(x-y)\min, P(x-y)\min_x, P(x-y)\min_y),$$

$$D = (P(x-y)\max, P(x-y)\max_x, P(x-y)\max_y)$$

Now there are two lists of vertices; one formed from analysis of the non-rotated set of points and the other from analysis of the rotated set of points. The lists may be identical. If the two lists of vertices are different, then the central processing unit may determine which list to use for further processing by selecting the list that describes the polygon with the largest area. In this way, the central processing unit eliminates the list where one or more of the extrema may have been missed.

Figure 5:
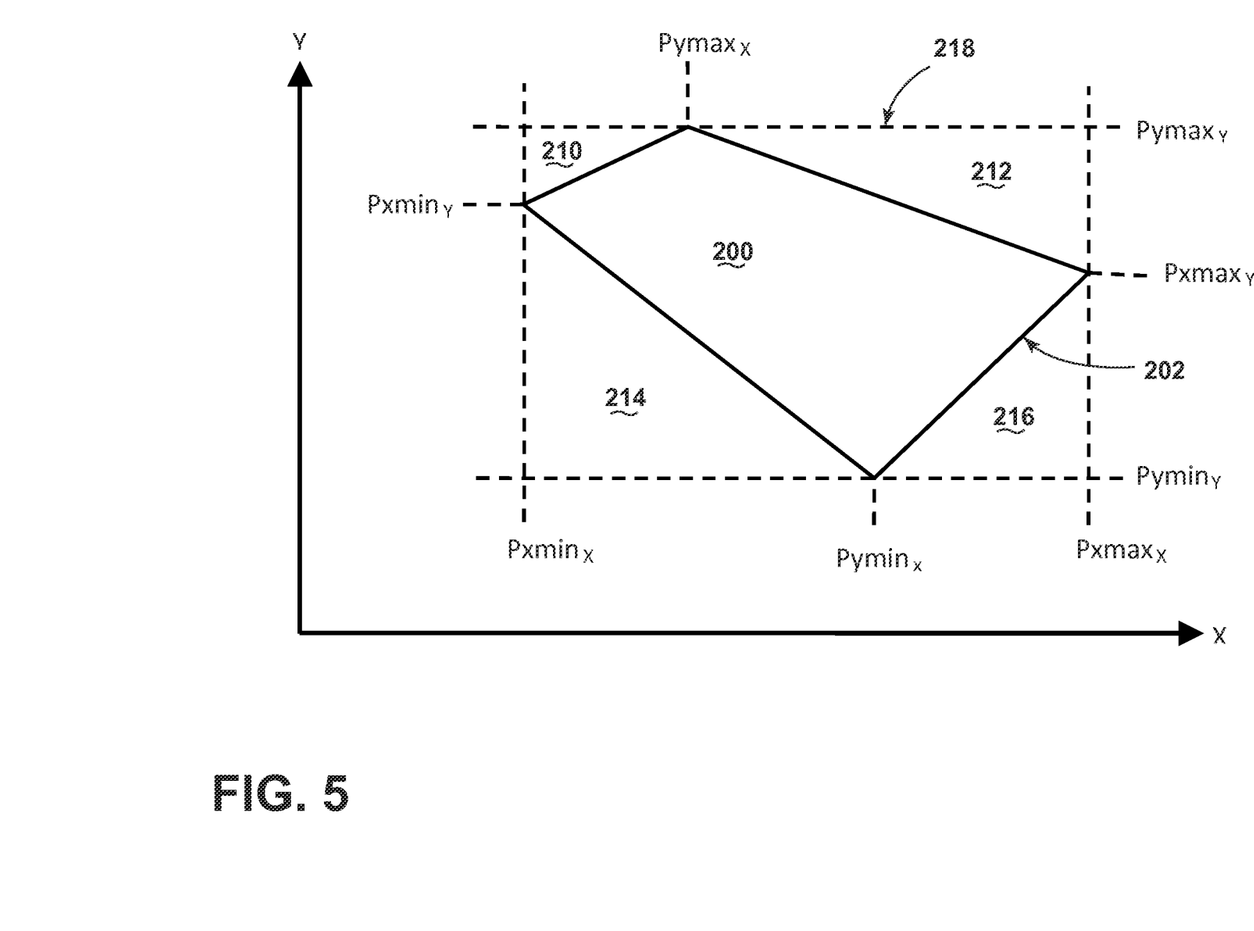
FIG. 5 demonstrates a bounding box applied to a polygonal feature used for determining decimation.

Referring now to FIG. 5, the central processing unit may determine the area 200 of the polygonal feature 202 formed by the non-rotated list of vertices. For example, the central processing unit may form the bounding box 218 (i.e. the smallest rectangle that encloses the quadrilateral representation of the feature). Then the central processing unit may subtract from the area of the bounding box 218, the areas 210, 212, 214, 216 of the four triangles enclosed by the bounding box but not intersecting the area 200 of the feature 202. The central processing unit may calculate the area by the following formula:

$$\begin{aligned}\text{Area} = &(Pxmax_X - Pxmin_X) * (Pymax_Y - Pymin_Y) - \\ &1/2 * \{(Pxmax_X - Pymax_X) * (Pymax_Y - Pxmax_Y) + \\ &(Pxmax_X - Pymin_X) * (Pxmax_Y - Pymin_Y) + \\ &(Pymin_X - Pxmin_X) * (Pxmin_Y - Pymin_Y) + \\ &(Pymax_X - Pxmin_X) * (Pymax_Y - Pxmin_Y)\}.\end{aligned}$$

Figure 6:
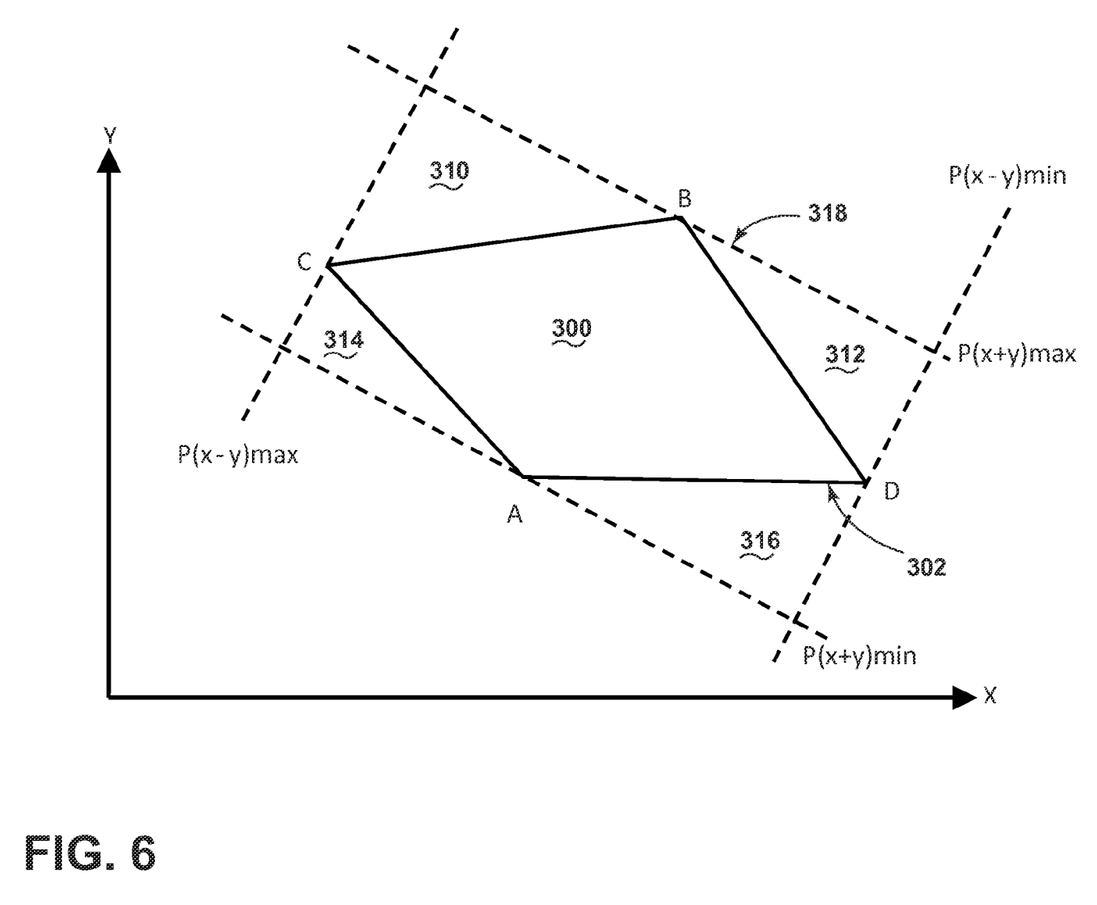
FIG. 6 demonstrates a bounding box applied to a rotated polygonal feature used for determining decimation.

Similarly, referring now to FIG. 6, the central processing unit may determine the area 300 of the polygonal feature 302 formed by the rotated list of vertices by the following general formula where the area 310, 312, 314, 316 for each of the triangles is subtracted from the area of the rotated bounding box 318:

$$\begin{aligned}\text{Area 45} = &1/2\{(B_x + B_y) - (A_x + A_y)\} * \{(D_x - D_y) - (C_x - C_y)\} - \\ &1/4\{-(B_x - D_x)^2 + (B_y - D_y)^2 + (B_x - C_x)^2 - (B_y - C_y)^2 - \\ &(C_x - A_x)^2 + (C_y - A_y)^2 + (D_x - A_x)^2 - (D_y - A_y)^2\}\end{aligned}$$

Based on the above described process of forming a candidate decimated triangle list (i.e. the polygonal feature formed with a list of four vertices with the greatest area), the central processing unit may then determine quantities indicative of the dimensions of the polygonal feature. The central processing unit approximates the square of the width, Da and the square of the length, Db of the polygonal feature by:

$$Da^2 = \text{MAX}[(Pxmax_X - Pymax_X)^2 + (Pxmax_Y - Pymax_Y)^2, (PxminX - Pymin_X)^2 + (Pxmin_Y - Pymin_Y)^2]$$

and $$Db^2 = \text{MAX}[(Pxmin_X - Pymax_X)2 + (Pxmin_Y - Pymax_Y)^2, (Pxmax_X - Pymin_X)^2 + (Pxmax_Y - Pymin_Y)^2]$$

In the case where the Area45>Area, the central processing unit substitutes (x+y) for x and (x−y) for y.

At this point, the central processing unit may determine to decimate the polygonal feature (that is, represent the feature with the list describing a 4-point quadrilateral or 3-point triangle) based on the size of the smaller of the width or height of the polygonal feature as compared to the pixel size in image coordinates of a display pixel. The central processing unit compares the width and height of the polygonal feature to a weighted value of the pixel size (i.e. n*Ps). If either of the width or the height are smaller than the weighted pixel size, then the central processing unit determines that the decimated list with the largest area will represent the feature for rendering to the display. Otherwise, the original, undecimated triangle string will represent the feature. Exemplary pseudocode for determining the triangle string to represent the polygonal feature is shown:

```
if ((Da²<(n*Ps)²) or (Db²<(n*Ps)²) then
        if (Area >Area45) then
                triangle string = [Pymin, Pxmin, Pxmax, Pymax]
        if (Area<Area45) then
                triangle string = [P(x−y)min, P(x+y)min, P(x+y)max,
                P(x−y)max]
        eliminate any duplicate points in triangle string
else    triangle string is not decimated
```

The variable n represents a decimation sensitivity factor preferably ranging from 1 to 10 that determines the sensitivity to pixel size. The decimation sensitivity factor may be different for each feature type. While the decimation sensitivity factor may be set to any value ranging from less than 1 up to a value greater than 10, it is preferable that the range is set from 1 to 10 and a value of approximately 2.1 is preferred. Other values may be applied as determined by the specific display characteristics.

As previously described, when the triangle list contains duplicate points, the polygon shape is triangular, and the result is a 3-point string for a single triangle keeping only the extreme points.

The central processing unit may then transmit the triangle string via the data bus to the cockpit display unit for rendering on a display panel of a display module. Using the above described method, an airport surface map with over 100,000 triangles may be reduced for transmission and rendering to around 10,000 triangles with decimation. Consequently, data transmission channel requirements requiring a shared data bus across multiple systems is reduced to a rate compatible with a partitioned Ethernet capability.

A commercial advantage of this invention according to embodiments presented is in the ability to be compatible with a partitioned processing and partitioned data transfer environment and still comply with the airworthiness requirements for data integrity (i.e., using non-altered data). Additional advantages include the provision that individual points defining a geographic feature are preserved and no new points are created. Airworthy regulations require that data used to depict an airport on a cockpit display not be altered from the original geographic survey and capture process. Consequently, the decimated data is applicable to open-sourced ARINC 816 Airport Surface Map data and systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of reducing a size of data representing an image in a graphical display wherein the data comprises triangle strings representing polygons that form the image, the method comprising:
   determining a size of a pixel in the image;
   selecting a triangle string that defines a first polygon, wherein the triangle string consists of a set of vertices;
   selecting a subset of vertices from the set of vertices;
   determining a second polygon from the subset of vertices;
   comparing the size of a pixel in the image to a dimension of the second polygon;
   determining a number of triangles in the triangle string;
   in response to the dimension of the second polygon being smaller than or about equal to the size of the pixel in the image, reducing the number of triangles in the triangle string to at least one of one triangle or two triangles; and
   in response to the dimension of the second polygon being larger than the size of the pixel in the image, leaving the number of triangles in the triangle string unchanged.

2. The method of claim 1 further comprising transmitting the triangle string over a time-shared Ethernet channel.

3. The method of claim 1 wherein the data complies with ARINC characteristic 816.

4. The method of claim 1 wherein the subset of vertices consists of four vertices.

5. The method of claim 4, wherein selecting the subset of vertices consists of:
   selecting a vertex located at a minimum X-coordinate;
   selecting a vertex located at a maximum X-coordinate;
   selecting a vertex located at a maximum Y-coordinate; and
   selecting a vertex located at a minimum Y-coordinate.

6. The method of claim 5, further comprising:
   determining multiple vertices share the minimum X-coordinate; and
   in response to determining multiple vertices share the minimum X-coordinate, selecting a single vertex with a smallest Y-coordinate.

7. The method of claim 5, further comprising:
   determining multiple vertices share the maximum X-coordinate; and
   in response to determining multiple vertices share the maximum X-coordinate, selecting a single vertex with a largest Y-coordinate.

8. The method of claim 5, further comprising:
   determining multiple vertices share the minimum Y-coordinate; and
   in response to determining multiple vertices share the minimum Y-coordinate, selecting a single vertex with a smallest X-coordinate.

9. The method of claim 5, further comprising:
   determining multiple vertices share the maximum Y-coordinate; and
   in response to determining multiple vertices share the maximum Y-coordinate, selecting a single vertex with a largest X-coordinate.

10. The method of claim 9, wherein the dimension is a narrowest dimension of the second polygon.

11. The method of claim 10, wherein the comparing includes multiplying the size of a pixel by a sensitivity factor.

12. The method of claim 11, wherein the sensitivity factor is approximately 2.1.

13. The method of claim 12, further comprising:
    determining a first area of the second polygon;
    defining a third polygon by rotating the subset of vertices 45 degrees;
    determining a second area of the third polygon;
    selecting the larger of the first area and the second area;
    determining whether the first area is equal to the selected area; and in response to determining the first area is equal to the selected area, using the second polygon to determine the narrowest dimension; and
    determining whether the second area is equal to the selected area; and in response to determining the second area is equal to the selected area, using the third polygon to determine the narrowest dimension.

14. The method of claim 13, wherein rotating the four vertices by 45 degrees is comprised of:
    substituting the minimum X-coordinate with a minimum (X+Y) coordinate;
    substituting the maximum X-coordinate with a maximum (X+Y) coordinate;
    substituting the minimum Y-coordinate with a minimum (X−Y) coordinate;
    substituting the maximum Y-coordinate with a maximum (X−Y) coordinate.

15. The method of claim 14, wherein determining the first area is comprised of:
    defining a smallest rectangle that encloses the second polygon;
    determining a rectangle area of the smallest rectangle;
    defining a set of four triangles where each triangle is enclosed by the smallest rectangle but does not intersect the second polygon;
    determining an area of the set of four triangles;
    subtracting the area of the set of four triangles from the rectangle area.

16. The method of claim 14, wherein determining the second area is comprised of:
    defining a smallest rectangle that encloses the third polygon;
    determining a rectangle area of the smallest rectangle;
    defining a set of four triangles where each triangle is enclosed by the smallest rectangle but does not intersect the third polygon;
    determining an area of the set of four triangles;
    subtracting the area of the set of four triangles from the rectangle area.

17. The method of claim 5, wherein when the subset of four vertices contains duplicate vertices, reducing the number of triangles in the triangle string to one triangle.

18. A system for displaying graphical images in an aircraft comprising:
- a graphical display in a cockpit of an aircraft; and
- a processor in communication with the graphical display over a limited bandwidth network, wherein the processor is configured to:
  - select a set of vertices from a triangle string,
  - define a polygon from the set of vertices,
  - determine a size of a pixel in the image, and
  - compare the size of a pixel in the image to a dimension of the polygon to determine a number of triangles in the triangle string, and
  - at least one of: reduce the number of triangles in the triangle string to at least one of one triangle or two triangles, in response to the dimension of the polygon being smaller than or about equal to the size of the pixel in the image, or leave the number of triangles in the triangle string unchanged, in response to the polygon being larger than the size of the pixel in the image; and
  - transmit the triangle string to the graphical display over the limited bandwidth network.

19. The system of claim 18, wherein the set of vertices consists of four vertices.

20. The system of claim 19, wherein the set of vertices consists of:
- a vertex located at a minimum X-coordinate;
- a vertex located at a maximum X-coordinate;
- a vertex located at a maximum Y-coordinate; and
- a vertex located at a minimum Y-coordinate.

* * * * *